Sept. 2, 1969   P. D. FLYNN ETAL   3,464,771
PHOTOELASTIC METHOD FOR DETERMINING ACCURATE VALUES OF
STRESS CONCENTRATION FACTORS
Filed Sept. 14, 1966

INVENTORS
PAUL D. FLYNN
ARTHUR A. ROLL
BY Harry M. Saragovitz,
Edward J. Kelly, Herbert Berl
& S. Dubroff
ATTORNEYS:

United States Patent Office 3,464,771
Patented Sept. 2, 1969

3,464,771
PHOTOELASTIC METHOD FOR DETERMINING ACCURATE VALUES OF STRESS CONCENTRATION FACTORS
Paul D. Flynn and Arthur A. Roll, Philadelphia, Pa., assignors to the United States of America as represented by the Secretary of the Army
Filed Sept. 14, 1966, Ser. No. 580,151
Int. Cl. G01b 11/16; G01n 3/00
U.S. Cl. 356—32                                                                5 Claims

ABSTRACT OF THE DISCLOSURE

A new photoelastic method for determining stress concentration factors that provides higher accuracy than heretofore attainable by experimental means. Models are tested with a known source of stress concentration, $k_1$, in series with one unknown source, $k_2$, which is calculated from the equation:

$$k_2 = k_1 \cdot \frac{\Delta(n_{\max.})_2}{\Delta(n_{\max.})_1} \cdot \frac{w_2}{w_1}$$

where the stress concentration factor $k = \sigma_{\max}/\sigma_{\text{nom}}$ based on the net section, $\Delta(n_{\max})$ is the increment in the maximum fringe order at the stress concentration corresponding to the increment in applied load, and $w$ is the net width of the bar. The high accuracy of this method lies in the use of the ratio $\Delta(n_{\max})_2/\Delta(n_{\max})_1$ so that errors due to extrapolation, time-edge effects, and other disturbances tend to cancel.

---

This invention relates to photoelastic study and particularly, to a method for determining accurate values of stress concentration factors and a photoelastic model which practically eliminates all errors due to time-edge effects, extrapolation procedures and other disturbances.

Civilization has always studied the problem of the load-carrying capacity of structural and machine elements and the mathematical analysis of the internal forces and deformations induced by applied loads. This mathematical analysis permits one to design structures and machines of unprecedented size and complexity. However, once given the completed design, it must be determined if it will function adequately.

If there exists in the structural or machine element a discontinuity which interrupts the stress path, the stress at the discontinuity may be considerably greater than the nominal stress on the section. Thus, the discontinuity is a source of stress concentration.

Stress concentration is not significant in the case of static loading of a ductile material because the material will yield inelastically in the region of high stress and, with the accompanying redistribution of stress, equilibrium may be established and no harm done. However, if the load is an impact or repeated load the material may fracture. Also, if the material is brittle, even a static load may cause fracture. Therefore, in the case of impact or repeated loading on any material or static loading on a brittle material, the presence of a source of stress concentration cannot be ignored. Any discontinuity, accidental or intended, is very apt to cause a failure in the design element. Therefore, the discontinuities due to deliberate design must be included in stress computations by an appropriate stress concentration factor.

The stress-concentration factor, $k$, is defined as the ratio of the maximum stress, $\sigma_{\max}$, to the average or nominal stress, $\sigma_{\text{nom}}$, computed by elementary means on the net cross-sectional area at the discontinuity, $$k = \frac{\sigma_{\max.}}{\sigma_{\text{nom.}}} \quad (1)$$

On the free boundaries of a photoelastic test model, $\sigma_{\max}$ can be calculated from the maximum fringe order, $n_{\max}$, using the stress-optic law in the form $$\sigma_{\max.} = \frac{n_{\max.} f}{t} \quad (2)$$

where $f$ is the material fringe value and $t$ is the thickness of the model. The calibration-shank method was developed in the 1930's to eliminate $f$. In this method, the model has a uniform section in series with the section containing the source of stress concentration, and the stress in the calibration shank, $\sigma_{\text{cal}}$, is given by $$\sigma_{\text{cal.}} = \frac{n_{\text{cal.}} f}{t} \quad (3)$$

where $n_{\text{cal}}$ is the corresponding fringe order. For a bar in tension or compression the force, $P$, acting through the model is equal to the average stress times the cross-sectional area so that $$P = \sigma_{\text{nom}} \, w_\text{b} t_\text{b} = \sigma_{\text{cal}} w_\text{c} t_\text{c} \quad (4)$$

where the subscripts $b$ and $c$ refer to the discontinuity and calibration sections, respectively, and $w$ is the net width of the bar. From Equations 1–4 and assuming that the material fringe value is the same at both sections, it follows that $$k = \frac{n_{\max.} \cdot w_\text{b}}{n_{\text{cal.}} \cdot w_\text{c}} \quad (5)$$

In Equation 5, $n_{\max}$ is the major source of error in determination $k$ by the calibration shank method, since $n_{\text{cal}}$ can be determined accurately by standard photoelastic techniques and the dimensions $w_\text{b}$ and $w_\text{c}$ can be measured with precision.

Errors in $n_{\max}$ are due mainly to difficulties in extrapolating fringe orders to the boundary and to time-edge effects, and have been a problem for a long time. One way to minimize the errors due to time-edge effects would be to use freshly machined test sections. But the use of more than one model in a test sequence would introduce additional variables and possible errors and also result in an increased cost for performing the tests.

Accordingly, a principal object of the present invention is to provide a method for obtaining accurate values of stress concentration factors.

Another object of the invention is to provide a photoelastic specimen which eliminates errors due to time-edge effects, extrapolation procedures and other disturbances.

A further object of the invention is to provide an optically sensitive model which will eliminate the need for freshly machined models in a test sequence.

In accordance with the present invention the foregoing and other objects are achieved by providing means for measuring stress concentration factors comprising a photoelastic model using a known source of stress concentration in series with an unknown source of stress concentration. A better understanding of the invention may be had by recourse to the following description, which description should be considered in conjunction with the accompanying drawings wherein.

A series of tests were conducted on a photoelastic model with symmetrical U-shaped grooves in which the depth was varied but the grooves were not freshly machined and the results showed some lack of reproducibility due mainly to small time-edge effects. Even though the laboratory was maintained at approximately 40 percent relative humidity and 75° F., the fluctuations in the results caused by time-edge effects could not be eliminated. In order to overcome this difficulty, a new model was designed with a circular hole in series with the section containing the grooves. The hole, which was subjected to the same environmental and loading conditions as the grooves, was used in the calculations as a self-calibrating source of stress concentration to cancel out the effects of time-edge disturbances and other possible sources of error.

Figure 1:
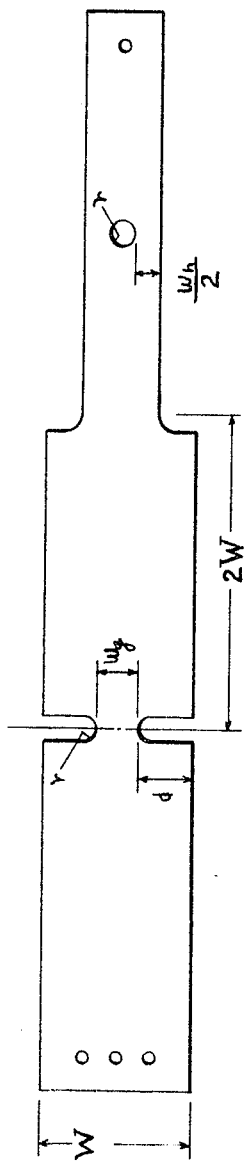
FIG. 1 depicts a top view of a specific embodiment of the inventive model.

The invention may be more fully understood by recourse to the drawings. FIG. 1 shows a top view of the inventive photoelastic model of a tension bar with symmetrical U-shaped grooves. The stress-concentration factors for a central circular hole in a tension bar are well established, and therefore the model was designed with a hole in series with the section containing the grooves. The model shown was designed so that the maximum fringe orders at the grooves and hole would be approximately equal. The radius $r$ of the hole was made the same as the radius at the grooves, and a ratio of hole diameter to total width W of the bar of 0.345 was used. In order to prevent interaction between the sources of stress concentration, a distance of at least twice the total width W of the bar was used before introducing a transition section, shown in FIG. 1 as 2W.

A circular polariscope and monochromatic light was used to photograph the stress patterns of the model. Homalite 100, a polyester resin, was selected as the model material because it is relatively free of time-edge effects and optical creep. It is to be understood that the test-model is not limited to this particular material, which is given merely for illustrative purposes. A jig borer and carbide burrs were used to machine the tension bar with grooves, and deadweight incremental loading was used for the stress concentration tests. At the end of each loading cycle, light and dark background stress patterns of critical sections were photographed.

Figure 2:
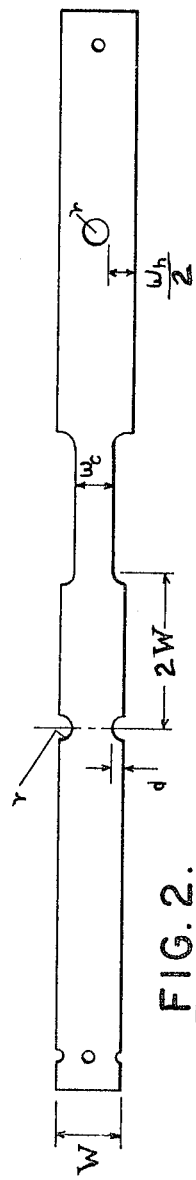
FIG. 2 is a view, similar to FIG. 1, showing a modification of the inventive model.

A photoelastic model having a $w_g/r$ ratio of 3 was used for the tests. The depth of the grooves was decreased in successive tests from $d/r$ equal to 4 to ¼, the section with the hole was unchanged and a calibration shank was added at $d/r$ equal to 1, as shown in FIG. 2. The principle of the self-calibrating source of stress-concentration factor at the grooves in terms of the value at the hole can be derived starting from Eq. 5 as follows:

$$k_g = \frac{(n_{\max.})g}{n_{\text{cal.}}} \cdot \frac{w_g}{w_h}$$

and $$k_h = \frac{(n_{\max.})h}{n_{\text{cal.}}} \cdot \frac{w_h}{w_c} \qquad (6)$$

where the subscripts $g$, $h$ and $c$ refer to the sections at the grooves, hole and calibration shank, respectively. Hence $$k_g = k_h \cdot \frac{(n_{\max.})g}{(n_{\max.})h} \cdot \frac{w_g}{w_h} \qquad (7)$$

In Eq. 7, the hole is considered to be a known source of stress concentration, and the true value $k_h'$ equal to 2.30, was based on work done by R. C. J. Howland, and reported in "On the Stresses in the Neighborhood of a Circular Hole in a Strip Under Tension," Phil. Trans. Royal Soc. (London) series A, 229, pp. 49–86 (1930). As stated before, the model was designed so that the maximum fringe orders at the grooves and hole would be approximately equal, and photographs of the over-all stress pattern of the grooves, hole and calibration shank showed that the sources of stress concentration acted in fields of uniform stress.

The grooves and hole were subjected to the same environmental conditions, and the errors introduced by time-edge effects were the same at these sections. Also $n_{\max}$ was subject to similar errors at both sections. By using the ratio of increments in the maximum fringe orders for a given increment in load, time-edge effects, extrapolating difficulties, and other possible sources of error such as small elastic deformations, three-dimensional effects due to finite thickness of the model, variations in the material fringe value and imperfections in the loading system tend to cancel. Accurate values of the stress-concentration factor at the grooves, $k_g'$ were calculated in terms of the known value at the hole by writting Eq. 7 in the form $$k_g' = k_h' \cdot \frac{\Delta(n_{\max.})g}{\Delta(n_{\max.})h} \cdot \frac{w_g}{w_h} \qquad (8)$$

A series of loads was used in each test of the model shown in FIG. 1. The increments in the maximum fringe orders and the stress concentration factor $k_g'$, calculated by Eq. 8 are summarized in the following table.

TABLE 1.—STRESS CONCENTRATION FACTORS

| Test | d, in. | d/r | $\Delta(n_{\max})g$ | $\Delta(n_{\max})h$ | $k'_g$ | $\Delta(n_{\text{cal}})$ | $k_g$ | $k_h$ |
|---|---|---|---|---|---|---|---|---|
| 1 | 0.800 | 4.00 | 7.71 | 7.71 | 1.82 | | 1.74 | 2.20 |
| 2 | 0.600 | 3.00 | 7.54 | 7.46 | 1.84 | | 1.70 | 2.13 |
| 3a | 0.400 | 2.00 | 7.86 | 7.67 | 1.86 | | 1.77 | 2.19 |
| 3b | | | 7.85 | 7.61 | 1.88 | | 1.77 | 2.19 |
| 4a | 0.300 | 1.50 | 7.85 | 7.57 | 1.89 | | 1.77 | 2.16 |
| 4b | | | 7.75 | 7.53 | 1.87 | | 1.75 | 2.15 |
| 5a | 0.200 | 1.00 | 7.64 | 7.48 | 1.86 | 4.45 | 1.72 | 2.13 |
| 5b | | | 7.74 | 7.62 | 1.85 | 4.45 | 1.74 | 2.17 |
| 6 | 0.100 | 0.50 | 7.81 | 7.71 | 1.84 | 4.43 | 1.76 | 2.20 |
| 7 | 0.050 | 0.25 | 7.12 | 7.77 | 1.67 | 4.43 | 1.61 | 2.20 |

It is seen that $k'_g$ reaches a maximum value at about $d/r$ equal to 1.5. Each of the three tests in this critical region of $d/r$ ratio was repeated, and the reproducibility was very good. The results obtained from the calibration-shank method using $\Delta(n_{\max})$ and $\Delta(n_{\text{cal}})$ in Eq. 5 are also included in the above table. In Tests 5–7 $\Delta(n_{\text{cal}})$ was nearly the same, and the average value was used to calculate $k_g$ and $k_h$ for all tests. Using this procedure, the values of $k_g$ do not exhibit a consistent trend. At the hole, the average value of $k_h$ is 6% low and fluctuates $\pm 2$ percent, approximately. The erratic behavior of $k_g$ and $k_h$ is apparently due to time-edge disturbances which are not eliminated by the calibration-shank method.

Also, it is important to note that the theoretical value of $k$ equal to 1.86 for semicircular grooves ($d/r=1$) was obtained directly from the photoelastic tests.

It thus appears that, when it is not feasible to use a model with freshly machined test sections the above described new method and photoelastic model give accurate results whereas the calibration-shank method does not. Furthermore, the method is preferably for precision work even when freshly machined test sections can be used because solving for the stress concentration factor involves the ratio of $\Delta(n_{\max})$'s so that extrapolation difficulties and other errors tend to cancel.

It will be further understood that various other changes may be made in the inventive device and the us ethereof without departing from the spirit and scope of this invention. For example, it should be pointed out that this device is not limited merely to grooves and holes. One skilled in the art can design suitable models and derive equations similar to Eq. 8 which are appropriate for members in bending, torsion, etc., using this new photoelastic method in conjunction with any convenient known source of stress concentration. Some of the ideas embodied in this new method could also be used with other experimental techniques such as strain gages in order to obtain more accurate results.

Having thus described our invention so that others skilled in the art may be able to understand and practice the same, and it being expressly understood that the invention is not limited to the aforesaid preferred embodiment but may be otherwise embodied or practiced without departing from its spirit and scope, we state that what we desire to secure by Letters Patent is defined in what is claimed.

We claim:

1. In a method of determining the stress concentration factor at a predetermined specimen location when the specimen is in a load carrying situation wherein said specimen is represented by an optically sensitive model which is birefringent when stressed said specimen location defining an unknown source of stress concentration, said method comprising the steps of machining said optically sensitive model to form in the model a known source of stress concentration in series with said unknown source of stress concentration, sequentially applying an incremental load to said model, photographing at least one stress pattern of said model before and after the change in load, and determining the stress concentration factor at said unknown source of stress concentration as specified by the equation:

$$k_2 = k_1 \cdot \frac{\Delta(n_{max.})_2}{\Delta(n_{max.})_1} \cdot \frac{w_2}{w_1}$$

where $k$ is the stress concentration factor, $\Delta(n_{max})$ is the increment in the maximum fringe order at the stress concentration corresponding to the loading increment, $w$ is the net width of the model, and the subscripts 1 and 2 refer to the known and unknown stress concentration respectively.

2. The method in accordance with claim 1 wherein a plurality of stress patterns are photographed before and after the change in load.

3. The method in accordance with claim 1 wherein the incremental load applying step includes an increase in load.

4. The method in accordance with claim 1 wherein the incremental load applying step includes a decrease in load.

5. The method in accordance with claim 1 wherein the incremental load applying step includes at least one condition of the incremental change where no load is applied.

References Cited

UNITED STATES PATENTS 3,039,298   6/1962   Zandman.

FOREIGN PATENTS 163,775   11/1964   U.S.S.R.
 38,641    4/1957   Poland.

RONALD L. WIBERT, Primary Examiner

J. ROTHENBERG, Assistant Examiner

U.S. Cl. X.R.

73—88